United States Patent [19]

Gotoh

[11] Patent Number: 4,643,346
[45] Date of Patent: Feb. 17, 1987

[54] METHOD FOR MANUFACTURING A FRAME FOR AN ELECTRIC MOTOR

[75] Inventor: Tohru Gotoh, Nagoya, Japan

[73] Assignee: Mitsubishi Denki Kabushiki Kaisha, Tokyo, Japan

[21] Appl. No.: 740,998

[22] Filed: Jun. 4, 1985

[30] Foreign Application Priority Data

Jun. 5, 1984 [JP] Japan ................................. 59-114924

[51] Int. Cl.⁴ .............................................. B21D 39/00
[52] U.S. Cl. ..................................... 228/155; 228/232; 29/596
[58] Field of Search ................ 228/155, 232, 157; 29/596

[56] References Cited

U.S. PATENT DOCUMENTS

| | | | |
|---|---|---|---|
| 2,716,276 | 8/1955 | Brown | 228/232 |
| 3,129,496 | 4/1964 | Cox | 228/155 |
| 3,920,174 | 11/1975 | Lamborn | 228/155 |
| 3,986,644 | 10/1976 | Hart et al. | 228/155 |
| 4,244,098 | 1/1981 | Barcus | 29/596 |

*Primary Examiner*—Kenneth J. Ramsey
*Attorney, Agent, or Firm*—Leydig, Voit & Mayer

[57] ABSTRACT

A method for manufacturing a frame for an electric motor including a frame main body and a metallic member welded to the outer surface of the frame main body is disclosed. After metallic members such as cooling fins are attached to the outer surface of a hollow cylindrical frame main body by projection welding which results in distortion of the frame main body due to radial expansion, sizing is applied to the inner surface of the frame main body by applying a radially outward force from inside of the frame main body to remove the distortion and expand the frame main body so that the inner surface of the frame main body defines a true circle.

5 Claims, 9 Drawing Figures

METHOD FOR MANUFACTURING A FRAME FOR AN ELECTRIC MOTOR

BACKGROUND OF THE INVENTION

This invention relates to a method for manufacturing a cylindrical frame for an electric motor, and more particularly to a method for manufacturing an electric motor frame having a metallic member such as a cooling fin welded to the outer surface of the main body of the frame.

In order to dissipate heat generated in an electric motor during its operation, a plurality of cooling fins are provided on the outer cylindrical surface of the motor housing or the main body of the motor frame. A method has already been proposed of manufacturing a motor frame including a main body and a metallic member welded to the outer surface of the main body. According to this proposed method, a blank metallic sheet is rounded into the shape of a cylinder by a rolling machine such as a three-roller bending machine, and seam welded at the joint. This tube is then subjected to sizing by a plurality of expansion pawls to radially expand and plastically form the tube so that the inner circumferential surface of the tube defines a true circle. The tube is then provided at its outer peripheral surface with a plurality of cooling fins attached by projection welding, for example. A stator core having a plurality of coils within slots is inserted into the frame thus obtained to complete a motor stator.

With the motor frame thus manufactured, in order to effectively dissipate the heat generated during the operation of the motor, the area of contact area or the welded area between the cooling fins and the outer surface of the frame main body must be as large as possible. However, if the welded area between the fins and the frame main body is increased, the welding heat added to the main body is large, resulting in the thermal deformation or distortion of the frame main body due. The thermal distortion effects radius of curvature of the inner circumference of the tubular frame main body and causes the circumferential expansion of the frame main body itself at the welded portions. When the stator core is inserted into the motor frame which is distorted as described above, a local air gap is formed between the stator core and the inner surface of the frame. Therefore, the heat conduction between the inserted core and the frame is degraded due to the air gap, decreasing the heat dissipation through the cooling fins disposed on the outer circumference of the frame main body.

SUMMARY OF THE INVENTION

Accordingly, an object of the present invention is to provide a method for manufacturing a frame for an electric motor free from the above disadvantage of the manufacturing method described above.

Another object of the present invention is to provide a method for manufacturing a motor frame in which there is intimate contact between the stator core and the frame main body to effectively conduct heat from the stator core.

With the above object in view, the method of the present invention for manufacturing a frame for an electric motor including a frame main body and a metallic member welded to the outer surface of the frame main body comprises the steps of preparing a hollow cylindrical frame main body, and preparing metallic members such as cooling fins to be welded to the main body. The cooling fins are attached to the outer surface of the frame main body by projection welding. The inner surface of the frame main body is the subjected to sizing by applying a radially outward force thereto from inside the frame main body to expand the frame main body so that the inner surface of the frame main body defines a true circle. A stator core can then be inserted into the frame main body without forming any air gap between the outer surface of the stator core and the inner surface of the frame main body, improving the thermal conductivity between the core and the frame and the cooling fins.

BRIEF DESCRIPTION OF THE DRAWINGS

The present invention will become more readily apparent from the following description of a preferred embodiment thereof and the accompanying drawings, in which.

DESCRIPTION OF THE PREFERRED EMBODIMENT

Figure 1:
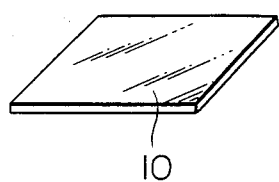
FIG. 1 is a perspective view illustrating a sheet used to form a frame main body.
Figure 2:
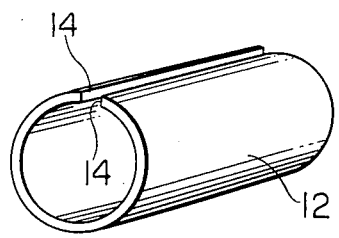
FIG. 2 is a perspective view illustrating the sheet material rolled into the shape of a cylinder.

As seen from FIGS. 1 to 7 in which the steps of a method of manufacturing a motor frame according to the present invention are illustrated, a rectangular steel sheet 10 as shown in FIG. 1 is prepared and is rolled into the shape of a tube 12 having a circular cross section so that the opposite ends 14 of the sheet 10 face each other as shown in FIG. 2. This rolling the steel sheet 10 into a tube 12 may be achieved by the use of a two or three-roller bending machine (not shown) in the manner well known in the art.

Figure 3:
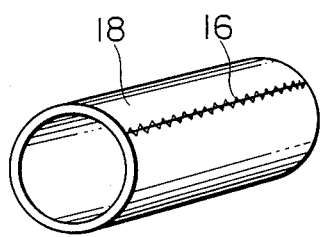
FIG. 3 is a perspective view illustrating a seam welded tubular frame main body.
Figure 4:
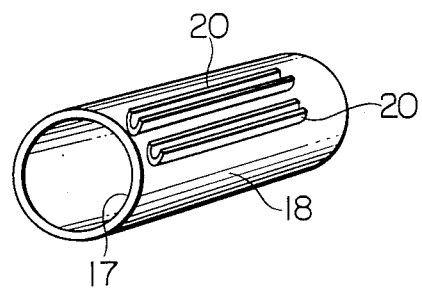
FIG. 4 is a perspective view illustrating the cooling fins welded on the frame main body.

The opposing ends 14 of the tube 12 thus formed are seam-welded to form a seam 16 in the tube 12 in a conventional manner thus forming a hollow cylindrical frame main body 18 having a circular cross section as illustrated in FIG. 3.

Figure 5:
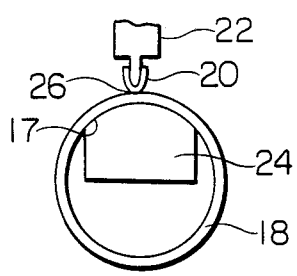
FIG. 5 is a front view illustrating the manner in which the cooling fins are projection welded.
Figure 6:
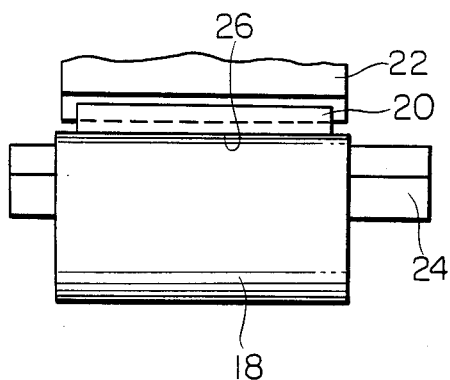
FIG. 6 is a side view illustrating the manner in which the cooling fins are projection welded.

The frame main body 18 thus formed is then provided with a plurality of metallic members 20 such as cooling fins or reinforcing members. In this embodiment, the metallic members 20 are cooling fins which are elongated channel members having a substantially U-shaped cross section. The cooling fins 20 may be manufactured by bending a rectangular steel sheet into the shape shown in the figures. The cooling fins 20 are rigidly attached to the outer surface of the frame main body 18 by the projection welding technique schematically shown in FIGS. 5 and 6. In FIGS. 5 and 6, the upper electrode 22 of a conventional projection welding machine is inserted into the "U" of the cooling fin 20 and the lower electrode 24 of the welding machine is inserted into the tubular frame main body 18 so that its upper surface is placed on the inner circumferential surface 17 of the tubular frame main body 18. The upper and the lower electrodes 22 and 24 are urged toward each other in order that the bight portion 26 of the U-shaped cooling fins 20 is firmly pressed against the outer peripheral surface of the tubular frame main body 18, and a welding electrical current is passed between the electrodes 22 and 24 through the bight portion 26 of the cooling fin 20 and the frame main body 18 to perform projection welding. The cooling fins 20 are secured to the outer surface of the tubular frame main body 18 so that they extend parallel to the direction of the axis of the main body 18 at substantially equal intervals around the outer periphery of the frame main body 18. This, however, results in a distortion on the frame main body due to radial expansion from projection welding.

Figure 7:
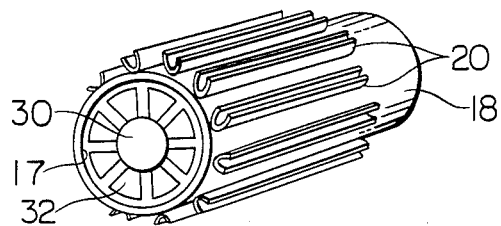
FIG. 7 is a perspective view of the motor frame assembly during the sizing.
Figure 8:
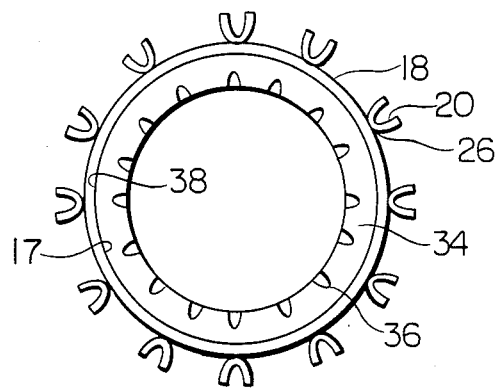
FIG. 8 is a front view of the motor frame with the stator core inserted into the frame.

Therefore, in keeping with an aspect of the present invention, after all of the cooling fins 20 are projection-welded to the frame main body 18 and a motor frame assembly comprised of the cooling fins 20 and the frame main body 18 is obtained, the inner surface of the frame main body 18 of the motor frame assembly is subjected to sizing as illustrated in FIG. 7. After the sizing has been completed, a stator core 34 having a plurality of coil slots 36 is press fit into by elastic expansion of the tubular frame main body 18 so that the outer circumferential surface 38 of the stator core 34 is in intimate contact with the inner circumferential surface 17 of the frame main body 18 as shown in FIG. 8.

The sizing is carried out by applying a radially outward force to the frame main body 18 from its inside by using a sizing machine 30 (FIG. 7) having a plurality of expansion pawls 32 to expand the inner surface 17 of the tubular frame main body 18 so that the inner surface 17 of the frame main body 18 which usually is distorted from a true circle due to the welding heat is radially expanded to define a true circle which has a diameter suitable for receiving the stator core 34 press fit therein after the manufacturing of the motor frame has been completed. By making the percent radial expansion of the inner surface 17 of the frame main body 18 by the sizing sufficiently larger than the mean percent radial expansion of the frame main body 18 due to the projection welding, which is calculated from the circumferential expansion, the frame main body 18 can be manufactured to have an inner circumference surface having the shape of substantially a true circle which allows the outer circumferential surface 38 of the stator core 34 (see FIG. 8) to be brought into intimate contact with the inner circumferential surface 17 of the frame main body 18 over a large area.

Figure 9:
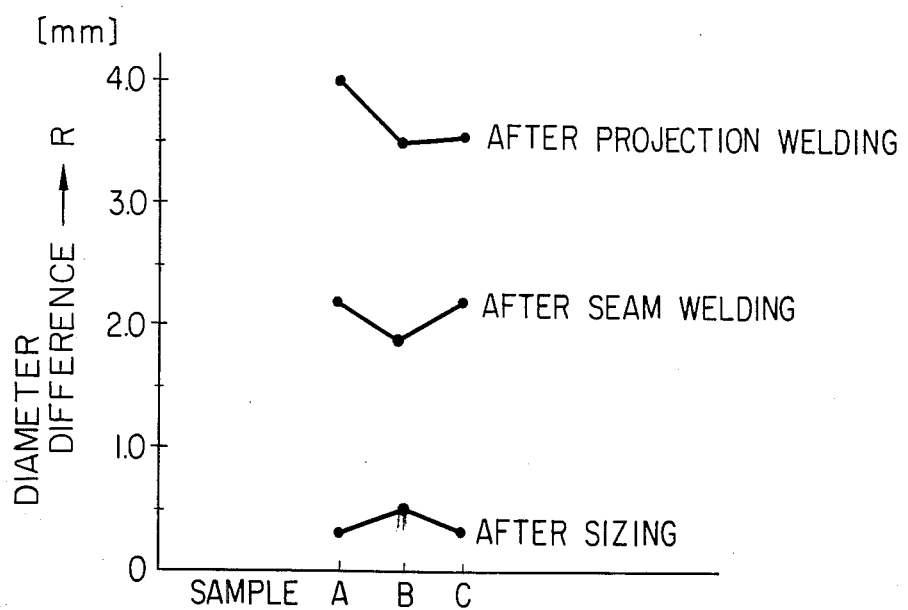
FIG. 9 is a graph showing the effect of sizing on the diameter of the frame main body.

FIG. 9 is a graph showing the results of measurements of the difference (R) between the largest inner diameter ($R_{max}$) and the smallest inner diameter ($R_{min}$) of sample motor frames A, B, and C having an inner diameter of 160 mm. It is seen from the graph that while the difference R of the sample A after the seam welding (FIG. 3) is about 2.2 mm, the difference R of the same sample A is increased to about 4.0 mm after the cooling fins 20 are projection welded (FIG. 4), but the difference R of the sample A is dramatically reduced to about 0.4 mm after the sizing (FIG. 7). From this, it can be seen that the advantages of the sizing after the projection welding of the cooling fins 20 according to the present invention are significant.

As apparent from the foregoing description, the area of intimate contact between the inner surface 17 of the frame main body 18 and the outer surface 38 of the stator core 34 is very large, and the welding areas between the cooling fins 20 and the frame main body 18 can be made large, and the heat generated within the motor can be smoothly conducted to the cooling fins 20, increasing the heat dissipating efficiency.

While the present invention has been described in terms of a single preferred embodiment, many modifications and alterations can be incorporated. For example, additional sizing may be applied to the inner surface 17 of the frame main body 18 after the tubular frame main body 18 is obtained by the seam welding step shown in FIG. 3 and before the projection welding step shown in FIG. 4 in order to make the inner surface 17 of the frame main body 18 circular. This additional sizing step is particularly useful when the accuracy of forming of the frame main body into a cylinder is low to the extent that the projection welding of the cooling fins 20 becomes difficult. When this additional sizing is carried out, the dimensions of the steel sheet 10 to be rolled into a cylinder 12 are preferably determined with the expansion due to sizing taken into consideration.

Also, pairs of cooling fins 20 on opposite ends of a diameter of the frame main body 18 are preferably projection-welded concurrently or in succession to distribute the thermal distortion of the frame main body 18.

Since the thermal distortion due to welding of the base, the slingers, and the mounting flanges (not shown) to the frame main body 18 is very small compared to that due to welding of the cooling fins 20, they may be welded at any stage after the seam welding step shown in FIG. 3 and before the stator core insertion step shown in FIG. 7.

What is claimed is:

1. A method for manufacturing a frame for an electric motor including a frame main body comprising the steps of:
   preparing a hollow cylindrical frame main body of a circular cross section;
   preparing a plurality of metallic elongated cooling fins to be welded to the frame main body;
   attaching said plurality of cooling fins to the outer surface of said frame main body by projectionwelding, which results in distortion of the frame main body due to radial expansion during the projection welding; and
   sizing the inner surface of said frame main body by applying a radially outward force thereto from inside said frame main body to expand the frame main body so as to remove the distortion and produce, by plastic expansion, a greater percent radial expansion of the inner surface of the frame main body than the mean percent radial expansion of the inner surface of the frame main body due to the distortion during projection welding, and an inner surface of said frame main body in the form of a true circle.

2. A method for manufacturing a frame for an electric motor as claimed in claim 1 wherein said metallic member is an elongated cooling fin having substantially a U-shaped cross section.

3. A method for manufacturing a frame for an electric motor as claimed in claim 1 wherein said frame main body is formed by seam welding the longitudinal joint of a metallic sheet rolled into a cylinder.

4. A method of manufacturing a frame for an electric motor as claimed in claim 1 wherein said step of sizing the inner surface of said cylindrical frame main body comprises plastic forming by a plurality of expansion pawls.

5. A method for manufacturing a frame for an electric motor including a frame main body and a stator core comprising the steps of:
- preparing a hollow cylindrical frame main body of a circular cross section;
- preparing a plurality of metallic elongated cooling fins to be welded to the frame main body;
- attaching said plurality of cooling fins to the outer surface of said frame main body by projection welding, which results in distortion of the frame main body due to radial expansion during the projection welding;
- sizing the inner surface of said frame main body by applying a radially outward force thereto from inside said frame main body to expand the frame main body, by plastic expansion, so as to remove the distortion and produce an inner surface of said frame main body in the form of a true circle; and
- press-fitting the stator core into the frame main body by elastic expansion so that the outer circumferential surface of the stator core is brought into intimate contact with the inner circumferential of the frame main body.

* * * * *